United States Patent
Weingertner et al.

(10) Patent No.: US 9,713,192 B2
(45) Date of Patent: Jul. 18, 2017

(54) DEVICE AND METHOD FOR PROCESSING AUDIO DATA

(71) Applicant: Intel Corporation, Santa Clara, CA (US)

(72) Inventors: Philippe Weingertner, Fayence (FR); Jerome Parron, Fuerth (DE)

(73) Assignee: INTEL CORPORATION, Santa Clara, CA (US)

( * ) Notice: Subject to any disclaimer, the term of this patent is extended or adjusted under 35 U.S.C. 154(b) by 148 days.

(21) Appl. No.: 14/670,441

(22) Filed: Mar. 27, 2015

(65) Prior Publication Data

US 2016/0286599 A1   Sep. 29, 2016

(51) Int. Cl.
*H04W 76/04* (2009.01)
*H04W 52/02* (2009.01)
(Continued)

(52) U.S. Cl.
CPC ......... *H04W 76/046* (2013.01); *H04M 7/006* (2013.01); *H04W 52/0216* (2013.01); *H04W 72/1263* (2013.01); *Y02B 60/50* (2013.01)

(58) Field of Classification Search
CPC .................................................. H04W 76/046
See application file for complete search history.

(56) References Cited

U.S. PATENT DOCUMENTS 8,504,120 B2 * 8/2013 Zhang ............... H04W 52/0258
455/418

8,774,846 B2 * 7/2014 Laroia ................. H04W 40/244
370/336

(Continued)

FOREIGN PATENT DOCUMENTS

CN   1805289 A   7/2006
CN   103841493 A   6/2014

OTHER PUBLICATIONS

"VoLTE Power Consumption", Feb. 1, 2013 Renesas Mobile.*
(Continued)

*Primary Examiner* — Parth Patel
(74) *Attorney, Agent, or Firm* — Viering, Jentschura & Partner mbB

(57) ABSTRACT

A device is described comprising an audio processor configured to perform audio processing during an audio communication connection between the communication device and a second communication device, a memory configured to store at least a first audio processor wakeup schedule in accordance with a first predefined audio communication connection event and a controller configured to set at least one second audio processor wakeup schedule in accordance with a second predefined audio communication connection event being similar to the first audio processor wakeup schedule, and wake up the audio processor in accordance with at least one of the first audio processor wakeup schedule or the second audio processor wakeup schedule in response to the incidence of at least one of the first or second predefined audio communication connection events, wherein the audio processor is configured to enter into a sleep mode after the audio processing is complete and to enter into a processing mode from the sleep mode in response to a wake up signal received from the controller.

18 Claims, 15 Drawing Sheets

(51) Int. Cl.
  *H04M 7/00*    (2006.01)
  *H04W 72/12*   (2009.01)

(56) References Cited

U.S. PATENT DOCUMENTS

| | | | |
|---|---|---|---|
| 2003/0117968 A1* | 6/2003 | Motegi | H04W 52/0229 370/311 |
| 2006/0083393 A1* | 4/2006 | Richenstein | H04H 20/62 381/302 |
| 2007/0266265 A1* | 11/2007 | Zmudzinski | G06F 1/3203 713/300 |
| 2008/0130483 A1* | 6/2008 | Khandekar | H04L 5/0007 370/208 |
| 2009/0073907 A1 | 3/2009 | Cai | |
| 2009/0201843 A1 | 8/2009 | Wang | |
| 2010/0141400 A1* | 6/2010 | Radulescu | H04W 52/0225 340/10.33 |
| 2010/0150091 A1* | 6/2010 | Yu | H04W 72/042 370/329 |
| 2010/0299455 A1* | 11/2010 | Master | H04W 52/0216 709/248 |
| 2011/0319072 A1* | 12/2011 | Ekici | H04W 48/18 455/426.1 |
| 2012/0015649 A1* | 1/2012 | Li | H04W 36/0061 455/434 |
| 2012/0120958 A1* | 5/2012 | Mahadevan | H04L 12/12 370/392 |
| 2012/0185897 A1* | 7/2012 | Gould | G08B 27/005 725/33 |
| 2012/0204042 A1* | 8/2012 | Sistla | G06F 1/3206 713/310 |
| 2013/0268742 A1* | 10/2013 | Yamada | G06F 9/5044 712/226 |
| 2013/0316726 A1* | 11/2013 | Laws | H04W 4/02 455/456.1 |
| 2014/0099955 A1* | 4/2014 | Nukala | H04W 36/00 455/436 |
| 2014/0355526 A1* | 12/2014 | Kahrizi | H04L 5/00 370/329 |
| 2014/0369268 A1* | 12/2014 | Huang | H04L 1/00 370/329 |
| 2015/0095680 A1* | 4/2015 | Gossain | G06F 1/26 713/323 |
| 2016/0212698 A1* | 7/2016 | Guo | H04W 52/0203 |

OTHER PUBLICATIONS

Huotari: "VoLTE Power Consumption" Whitepaper: Feb. 1, 2013, Renesas Mobile, 8 pages.

European Search Report for the corresponding European Patent Application 16 15 6021.4, dated Jul. 1, 2016, 8 pages of Search Report.

Taiwanese Office Action based on Application No. 105105647 (3 Pages) dated Jan. 19, 2017 (Reference Purpose Only).

* cited by examiner

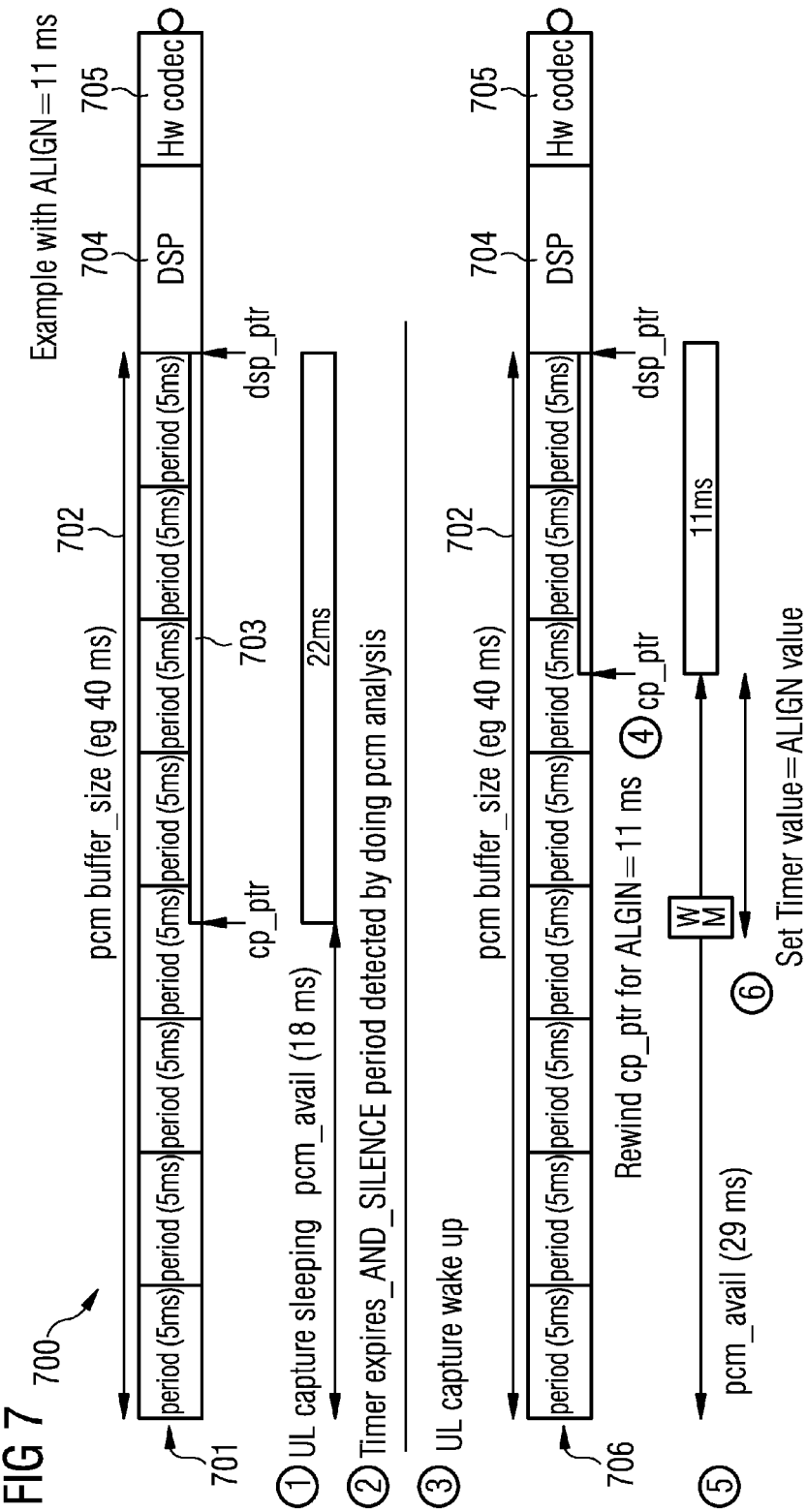

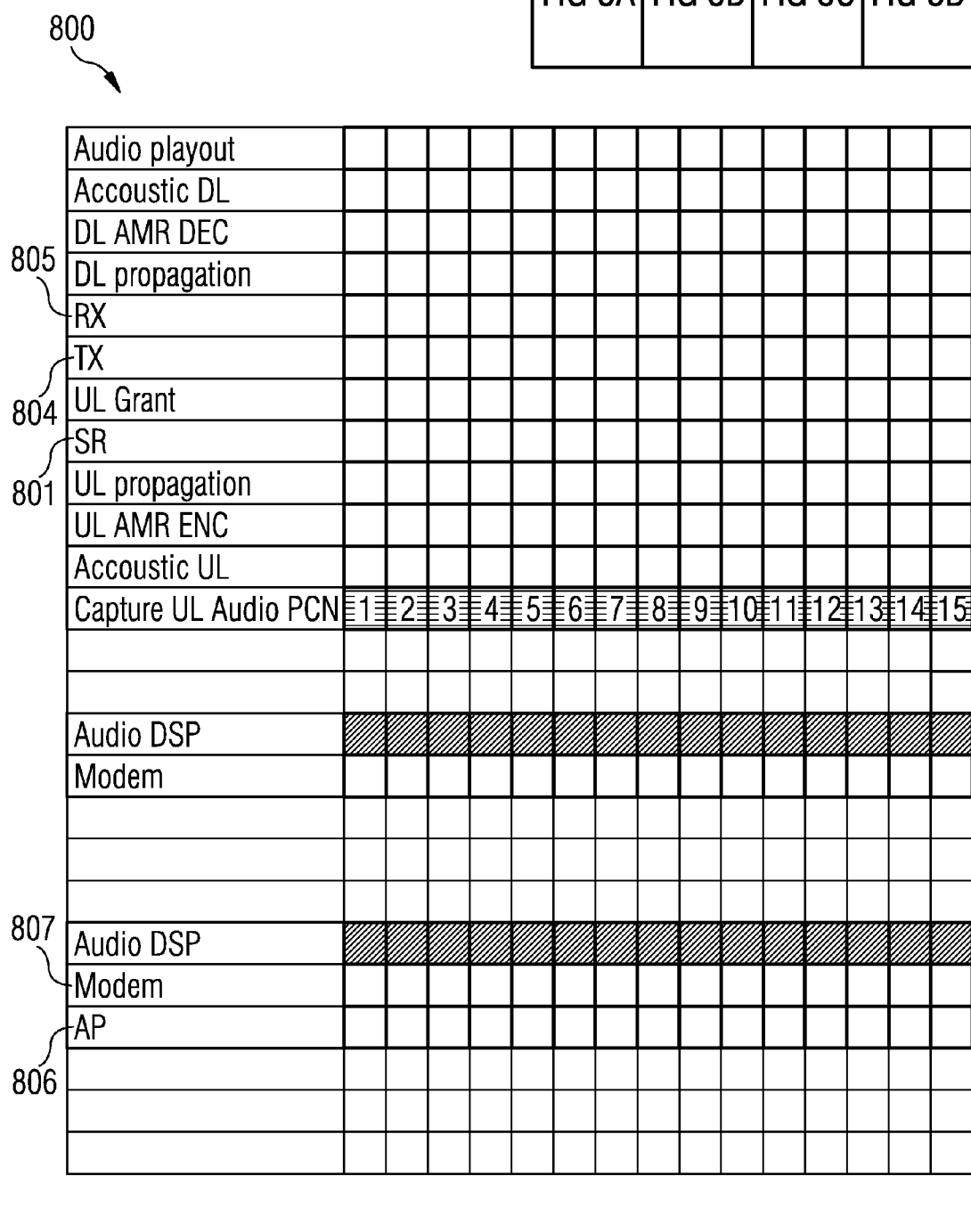

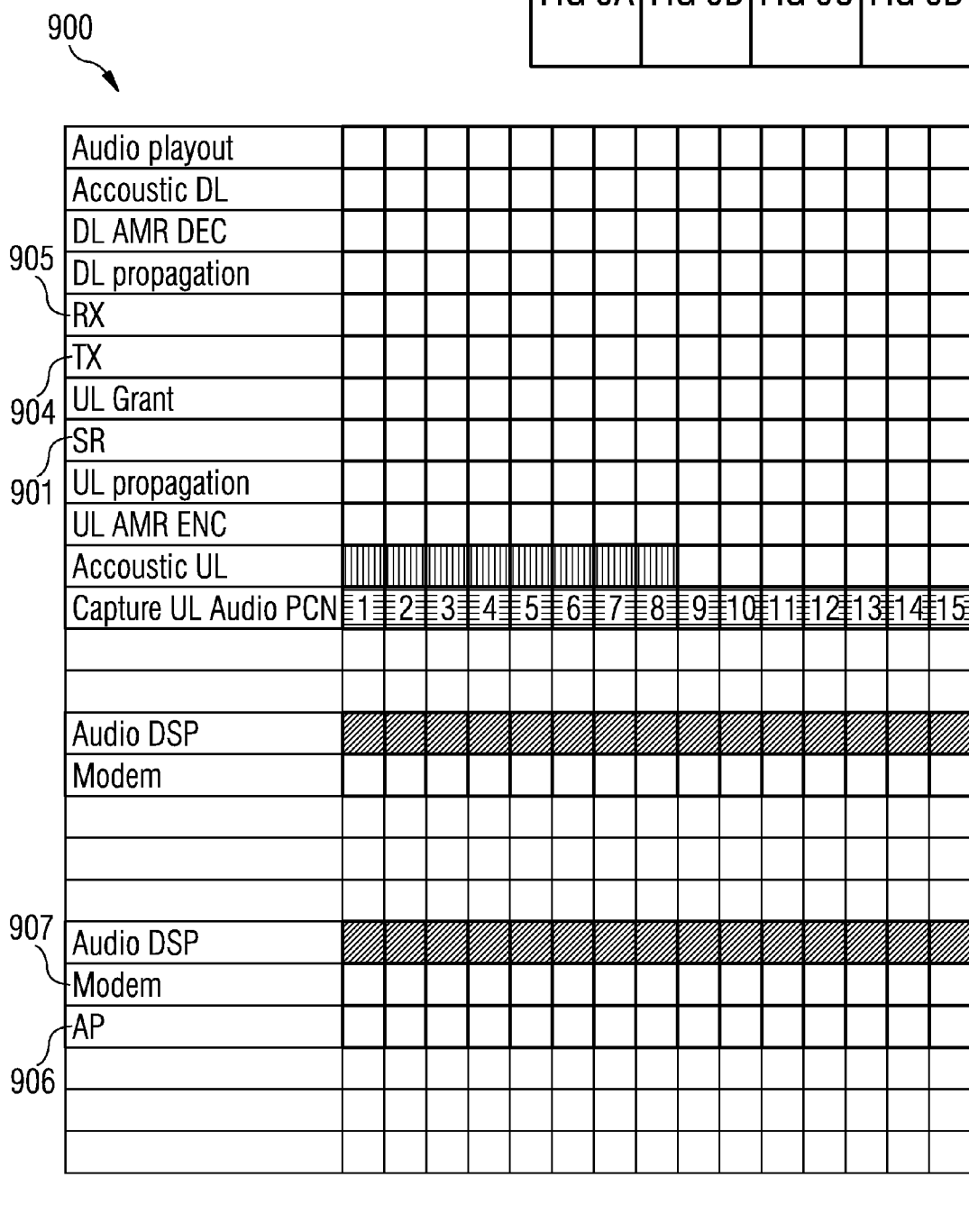

DEVICE AND METHOD FOR PROCESSING AUDIO DATA

TECHNICAL FIELD

Embodiments described herein generally relate to devices and methods for processing audio data.

BACKGROUND

Mobile phones are typically used for calls between their users. Such a call involves audio processing such as encoding and decoding of audio data carried out by some audio processing component. Typically, such an audio processing component has sufficient computational power to be able to perform the audio processing in short time intervals and can enter sleep mode between these intervals. In terms of power consumption, it is desirable to keep the number and the length of wakeups from sleep mode as low as possible.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 7 illustrates an alignment of a UL wakeup schedule with a DL wakeup schedule.

FIGS. 8 and 8A-8D show a RX-TX sync up with a 20 ms DRX radio configuration.

FIGS. 9 and 9A-9D show a RX-TX sync up with a 40 ms DRX radio configuration.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
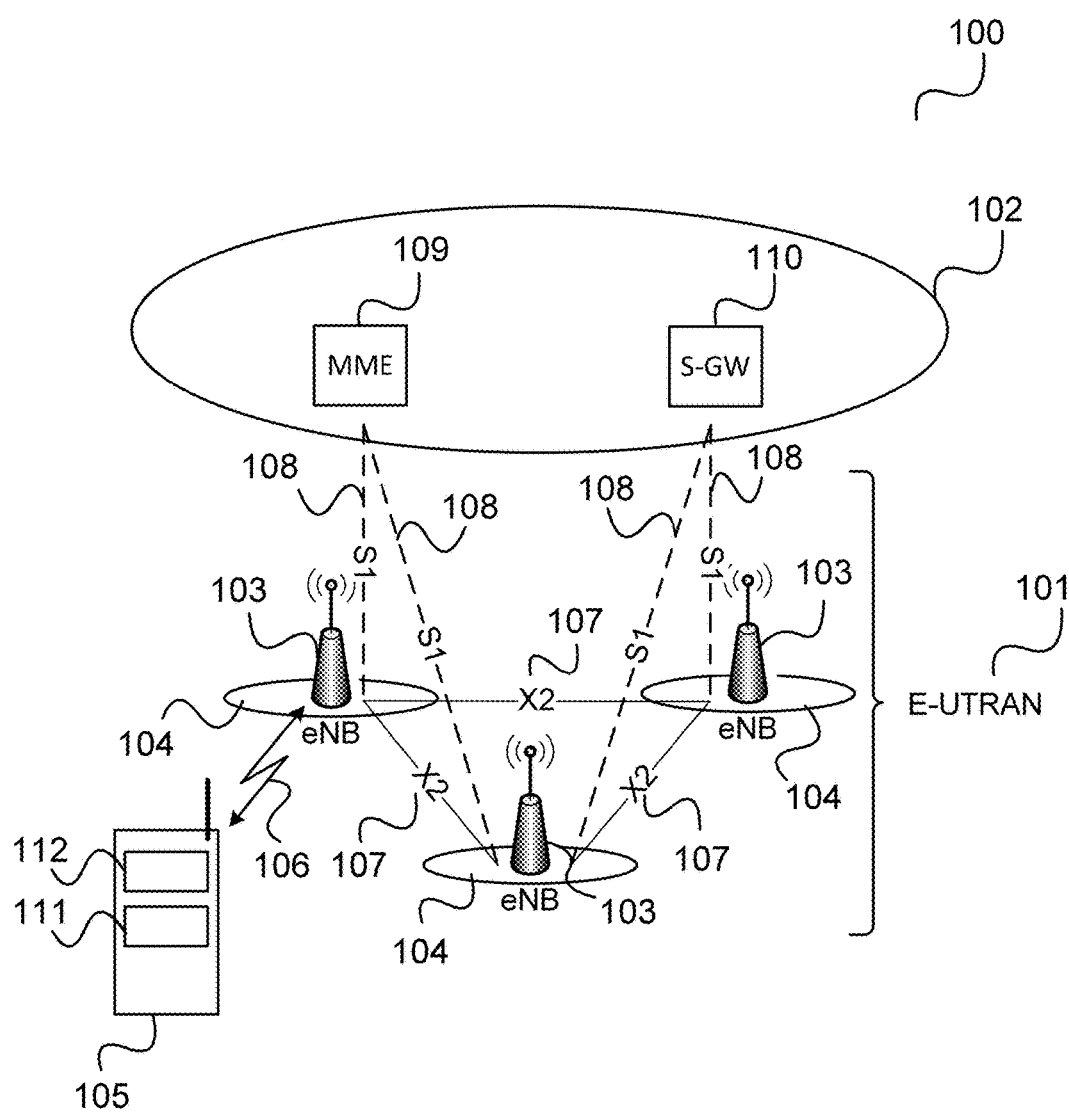
FIG. 1 shows a communication system.

FIG. 1 shows a communication system 100, for example according to 3GPP (Third Generation Partnership Project).

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications), WIFI etc.

A mobile terminal (e.g. a UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105. The mobile terminal 105 includes, among other typical components such as a speaker, a microphone and a memory, an application processor 111 and a modem 112.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol).

Data transmission between the mobile terminal 105 and the corresponding base station 103 (i.e. the base station operating the radio cell in which the mobile terminal 105 is located) is carried out in accordance with a (radio) frame structure. An example of a frame structure is shown in FIG. 2.

Figure 2:
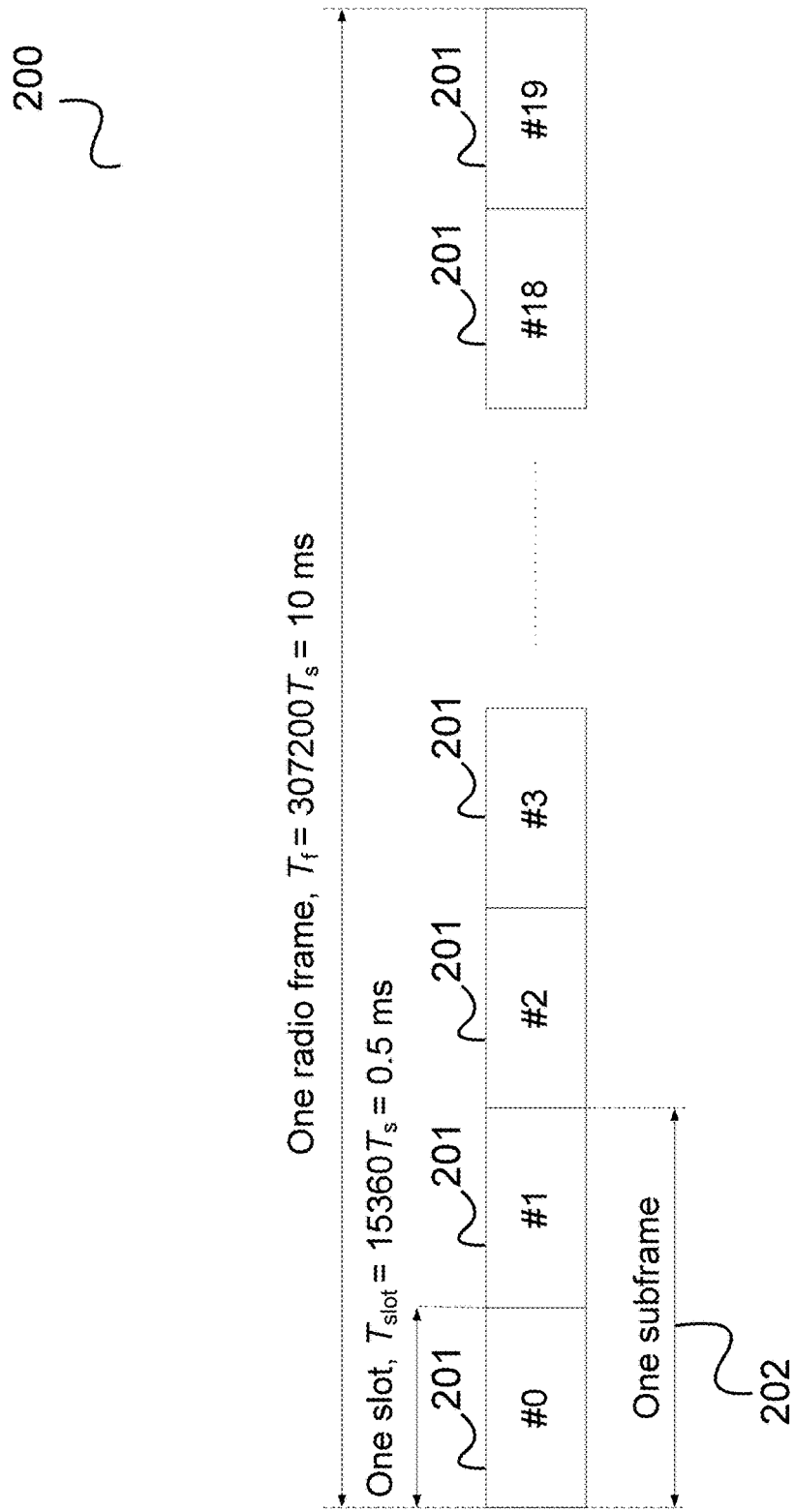
FIG. 2 shows a frame of an exemplary frame structure used in the communication system of FIG. 1.

FIG. 2 shows a frame 200 of an exemplary frame structure.

The frame 200 may be used for both full-duplex and half-duplex FDD. The frame 200 is 10 ms long and consists of 20 slots 201 of length 0.5 ms, numbered from 0 to 19. A subframe 202 is defined as two consecutive slots 201. In each 10 ms interval ten subframes 202 are available for downlink transmissions or uplink transmissions. It should however be noted that according to other radio access technologies like e.g. WIFI, a frame may have a different number of subframes than ten and a subframe may include more than two slots.

Uplink and downlink transmissions are separated in the frequency domain. Depending on the slot format a subframe 202 may include 12 or 14 OFDM (orthogonal frequency division multiple access) symbols in DL (downlink) and 12 or 14 SC-FDMA symbols in UL (uplink), respectively.

The user of the mobile terminal 105 may communicate with the user of another mobile terminal 105 via VoIP (Voice Over IP), e.g., in this example, VoLTE (Voice over LTE).

Figure 3:
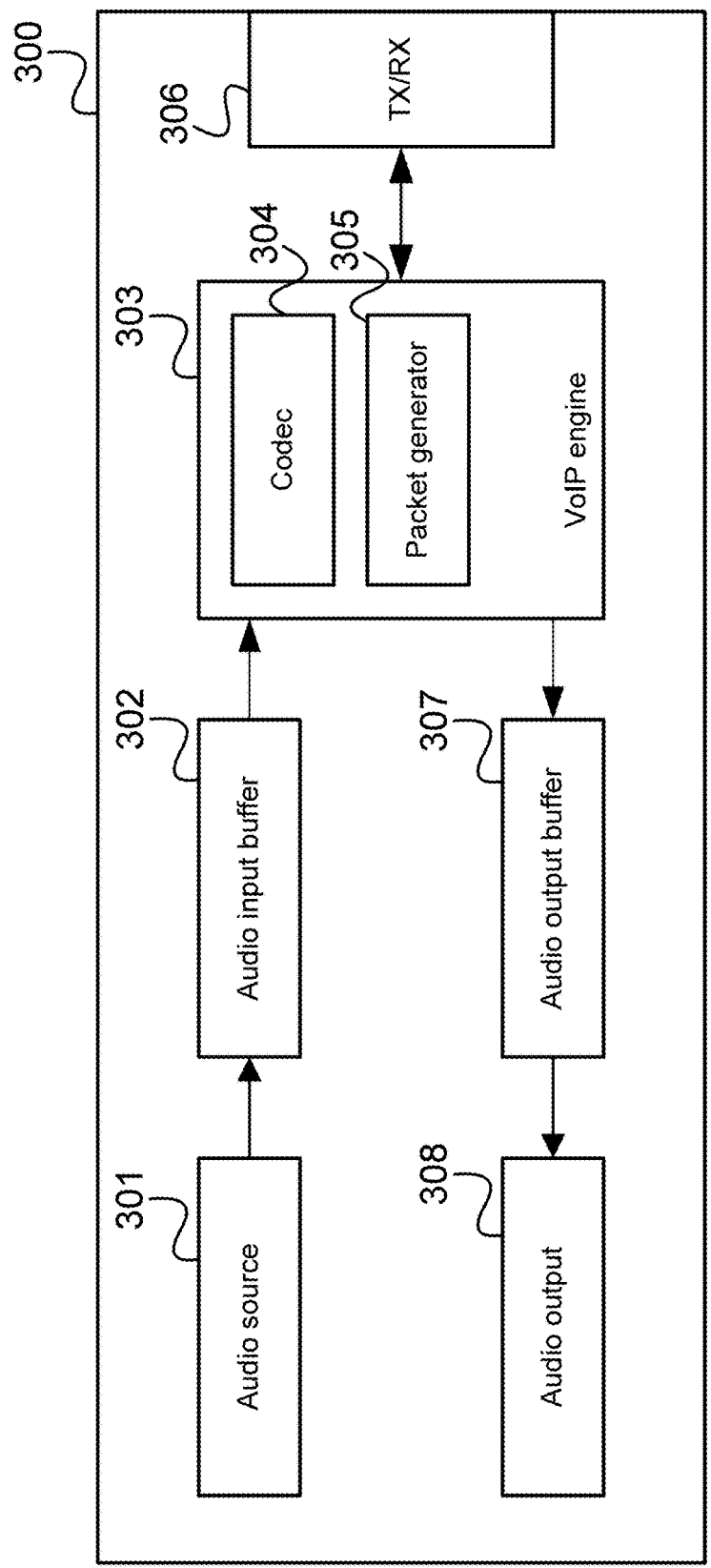
FIG. 3 shows an example for the architecture of a mobile terminal from a VoLTE perspective.

FIG. 3 shows an example for the architecture of a mobile terminal 300, e.g. corresponding to mobile terminal 105, from a VoLTE perspective.

Regarding transmission of audio, the mobile terminal 300 includes an audio source 301, e.g. a microphone into which the user of the mobile terminal 300 speaks together with an audio sampling circuit. The audio data, e.g. the audio samples, such as PCM (pulse code modulation) samples, are stored in an audio input buffer 302. A VoIP engine 303 reads out the audio data from the audio input buffer 302 and prepares them for transmission, e.g. by coding the audio data according to a codec 304 and generating packets according to a transmission protocol, e.g. according to RTP (real-time transmission protocol). The VoIP engine 303 supplies the processed audio data, e.g. RTP packets, to a transceiver 306 of the mobile terminal 300 which sends the processed audio data to a radio access network, e.g. to a base station 103 serving the mobile terminal 300.

Regarding reception of audio data, the transceiver 306 receives audio data, e.g. coded and in the form of packets, e.g. RTP packets, and supplies them to the VoIP engine 303. The VoIP engine 303 extracts the audio data, e.g. by extracting it from the packets and decoding it, and stores the extracted audio data in an audio output buffer 303 to be output by an audio output circuit 308 of the mobile terminal 300, e.g. including a digital to analog converter and a speaker.

In the following, a communication device is described which for example allows reducing power consumption of the mobile terminal 300 by aligning transmission and reception activities in an audio communication as described with reference to FIG. 3.

Figure 4:
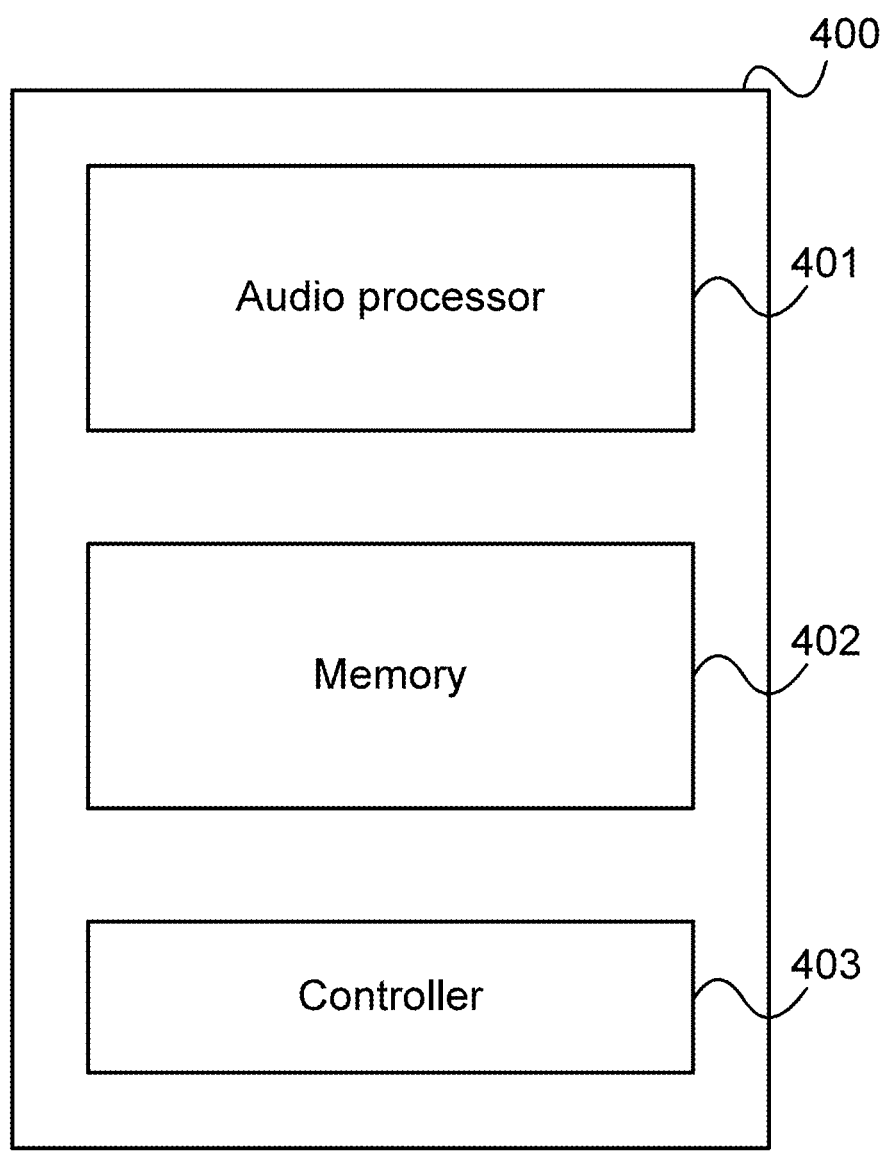
FIG. 4 shows a device.

FIG. 4 shows a device 400.

The device 400 includes an audio processor 401 configured to perform audio processing during an audio communication connection between a first communication device (e.g. corresponding to or comprising the device 400) and a second communication device and a memory 402 configured to store at least a first audio processor wakeup schedule in accordance with a first predefined audio communication connection event.

Further, the communication device 400 includes a controller 403 configured to set at least one second audio processor wakeup schedule based on (e.g. in accordance with) a second predefined audio communication connection event being (e.g. to be) similar to the first audio processor wakeup schedule, and send a wake up signal to the audio processor to wake up the audio processor based on (e.g. in accordance with) at least one of the first audio processor wakeup schedule or the second audio processor wakeup schedule in response to at least one of the first or second predefined audio communication connection events.

The audio processor 401 is further configured to enter into a sleep mode (or idle mode) after the audio processing is complete and to enter into a processing mode from the sleep mode in response to the wake up signal.

In other words, the wakeup schedules of a component of a communication device (e.g. corresponding to mobile phone 300) such as an application processor or a modem for different events (and e.g. tasks) in an audio communication are aligned.

For example, VoLTE power consumption (or in general any VoIP call power consumption) may be reduced by enabling dynamic alignment of audio transmission (TX) and reception (RX) activities. This may for example include one or more of the following:

The number of wake-ups to perform a VoLTE (or VoIP) communication (i.e. a call) is reduced.

An alignment of audio TX/RX activities may be performed during a call (e.g. at any point of time during the call). It is for example not necessarily performed at the time of the call startup or the time of a handover.

An alignment of audio TX/RX activities may happen in a smooth way. For example, it is performed during a silence period or using time scaling, e.g. by using speech frames time scaling in the uplink (UL) to align an uplink transmission activity with a downlink reception activity.

In order to minimize impact on overall end to end latency and speech quality, for VoLTE, UL/TX audio activities are for example aligned to the DL/RX audio activities rather than the opposite (so that the alignment procedure does not change DL Jitter Buffer Management processing and associated activities, statistics and triggers). This means that for example, triggers for UL/TX audio activities track triggers for DL/RX audio activities. In other words, for example, downlink is master and uplink is slave in terms of which activities define the schedule to which the others adjust, e.g. are shifted.

Audio transmission (i.e. uplink) activities may be understood to include UL/TX audio processing activities, i.e. audio processing in uplink, such as coding and packet generation, as well as UL/TX audio radio transmission activities, i.e. uplink radio transmission, e.g. including constellation mapping and the actual RF (radio frequency) transmission via the air interface.

Analogously, audio reception (i.e. downlink) activities may be understood to include DL/RX audio processing activities, i.e. audio processing in downlink, such as data extraction from packets and decoding, as well as DL/RX audio radio transmission activities, i.e. radio reception, e.g. including the actual RF (radio frequency) reception via the air interface and constellation demapping.

The components of the communication device (e.g. the audio processor, the memory and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 5:
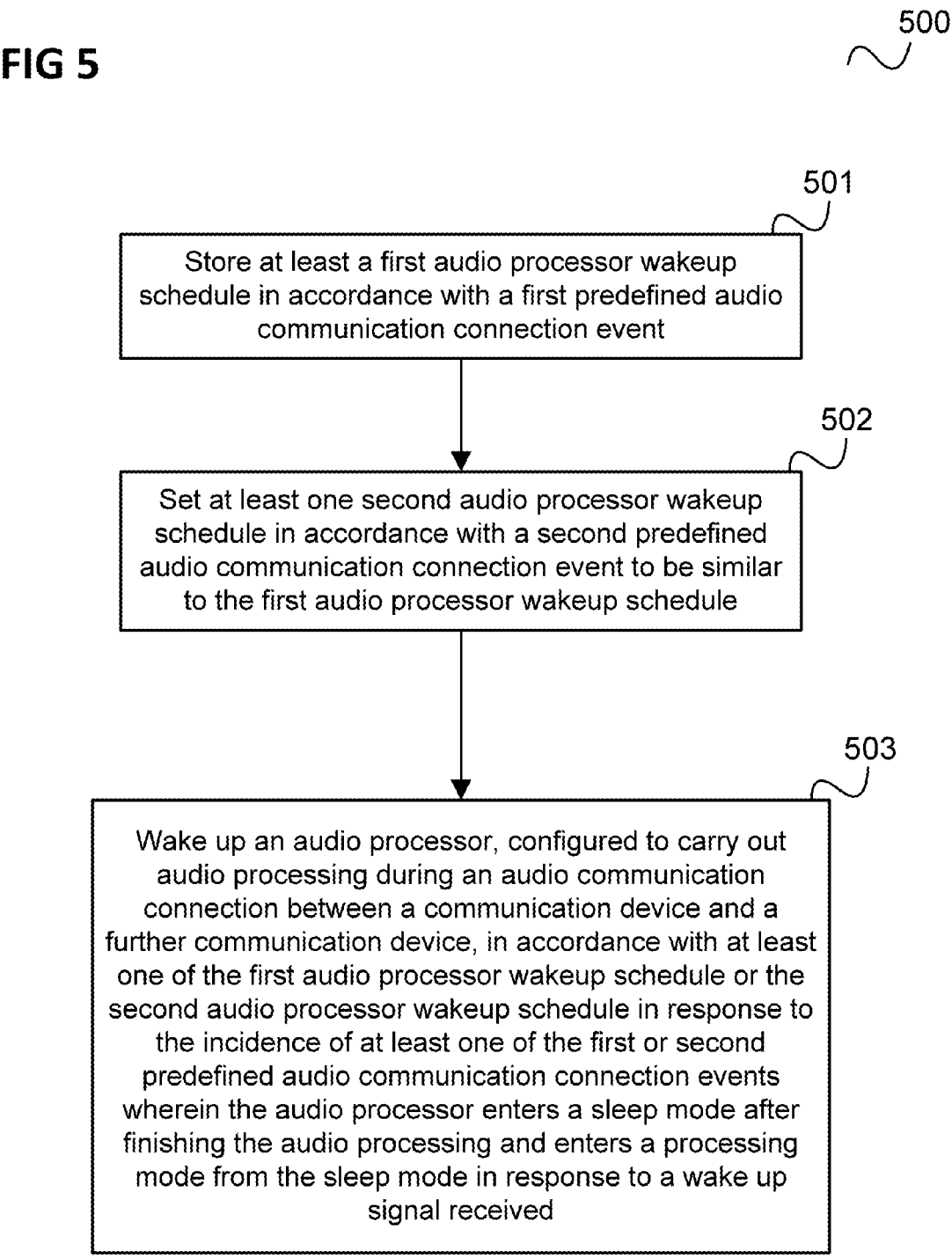
FIG. 5 shows a flow diagram illustrating a method for processing audio data.

The communication device 400 for example carries out a method as illustrated in FIG. 5.

FIG. 5 shows a flow diagram 500.

The flow diagram 500 illustrates a method for processing audio data, e.g. carried out by a communication device.

In 501, the communication device stores at least a first audio processor wakeup schedule based on (e.g. in accordance with) a first predefined audio communication connection event.

In 502, the communication device sets at least one second audio processor wakeup schedule based on (e.g. in accordance with) a second predefined audio communication connection event being similar to the first audio processor wakeup schedule.

In 503, the communication device sends a wake up signal to wake up the audio processor to perform audio processing during an audio communication connection between a first communication device and a second communication device, based on (e.g. in accordance with) at least one of the first audio processor wakeup schedule or the second audio processor wakeup schedule in response to the at least one of the first or second predefined audio communication connection events. The audio processor enters a sleep mode after the audio processing is complete and enters into a processing mode from the sleep mode in response to receiving the wake up signal. The following examples pertain to further embodiments.

Example 1 is a device as illustrated in FIG. 4.

In Example 2, the subject matter of Example 1 may optionally include the first predefined audio communication connection event being a start of processing of audio data to be transmitted to the second communication device and the second predefined audio communication connection being a start of processing of audio data received from the second communication device.

In Example 3, the subject matter of Examples 2 may optionally include the audio processor being configured to perform the processing of the audio data received from the second communication device in a shorter time than the processing of the audio data to be transmitted to the second communication device and setting the at least one second audio processor wakeup schedule being similar to the first audio processor wakeup schedule comprising scheduling the processing of the audio data received from the second communication device to be carried out by the application processor during the processing of the audio data to be transmitted to the second communication device.

In Example 4, the subject matter of any one of Examples 1-3 may optionally include the first predefined audio communication connection event being a radio transmission of audio data to the second communication device and the second predefined audio communication connection being a start of processing of audio data to be transmitted to the second communication device.

In Example 5, the subject matter of any one of Examples 1-4 may optionally include the first predefined audio communication connection event being a radio reception of audio data from the second communication device and the second predefined audio communication connection being a start of processing of audio data received from the second communication device.

In Example 6, the subject matter of any one of Examples 1-5 may optionally include the audio processing being an audio processing of audio data to be transmitted to the second communication device and comprising at least one of encoding of audio data from an audio source and forming packets of encoded audio data.

In Example 7, the subject matter of any one of Examples 1-6 may optionally include the audio processing being an audio processing of audio data received from the second communication device and comprising at least one of extracting encoded audio data from packets of encoded audio data and decoding encoded audio data.

In Example 8, the subject matter of any one of Examples 1-7 may optionally include setting the at least one second audio processor wakeup schedule being similar to the first audio processor wakeup schedule comprising setting wakeups according to the at least one second audio processor wakeup schedule to be within a predetermined tolerance of the first audio processor wakeup schedule.

In Example 9, the subject matter of Example 8 may optionally include the predetermined tolerance being 2%, 5%, 10% or 15% of the time between adjacent wakeups according to the first audio processor wakeup schedule.

In Example 10, the subject matter of any one of Examples 1-9 may optionally include the audio processing being processing of voice call data.

In Example 11, the subject matter of any one of Examples 1-10 may optionally include the audio communication connection being a Voice over IP audio communication connection.

In Example 12, the subject matter of any one of Examples 1-11 may optionally include the audio communication connection being a Voice over LTE audio communication connection.

In Example 13, the subject matter of any one of Examples 1-12 may optionally include setting the at least one second audio processor wakeup schedule being similar to the first audio processor wakeup schedule including shifting the at least one second audio processor wakeup schedule from a position according to which the audio processor was waked up previously during the audio communication connection to a position being similar to the first audio processor wakeup schedule.

In Example 14, the subject matter of Example 13 may optionally include the controller being configured to search for a silence period during the audio communication connection and perform the shift during a silence period found.

In Example 15, the subject matter of any one of Examples 13-14 may optionally include the controller being configured to perform the shift by scaling or discarding audio data.

In Example 16, the subject matter of any one of Examples 1-15 may optionally include the controller being configured to determine a difference between the wakeup timings of the at least one second audio processor wakeup schedule and the wakeup timings of the first audio processor wakeup schedule and setting the at least one second audio processor wakeup schedule being similar to the first audio processor wakeup schedule including shifting the at least one second audio processor wakeup schedule to reduce the difference between the wakeup timings of the at least one second audio processor wakeup schedule and the wakeup timings of the first audio processor wakeup schedule.

In Example 17, the subject matter of Example 16 may optionally include the controller being configured to determine the difference during the audio communication connection.

In Example 18, the subject matter of any one of Examples 16-17 may optionally include the controller being configured to detect whether the difference is above a predetermined threshold and to shift the at least one second audio processor wakeup schedule to reduce the difference between the wakeup timings of the at least one second audio processor wakeup schedule and the wakeup timings of the first audio processor wakeup schedule if the difference is above the predetermined threshold.

In Example 19, the subject matter of Example 18 may optionally include the predetermined threshold being 2%, 5%, 10% or 15% of the time between adjacent wakeups according to the first audio processor wakeup schedule.

In Example 20, the subject matter of any one of Examples 1-19 may optionally include the audio processor being implemented by an application processor of the first communication device or a modem of the first communication device.

In Example 21, the subject matter of any one of Examples 1-20 may optionally include the first communication device being a mobile communication device.

Example 22 is a method for processing audio data as illustrated in FIG. 5.

In Example 23, the subject matter of Example 22 may optionally include the first predefined audio communication connection event being a start of processing of audio data to be transmitted to the second communication device and the second predefined audio communication connection being a start of processing of audio data received from the second communication device.

In Example 24, the subject matter of Example 23 may optionally include the audio processor performing the processing of the audio data received from the second communication device in a shorter time than the processing of the audio data to be transmitted to the second communication device and setting the at least one second audio processor wakeup schedule being similar to the first audio processor wakeup schedule comprising scheduling the processing of the audio data received from the second communication device to be carried out by the application processor during the processing of the audio data to be transmitted to the second communication device.

In Example 25, the subject matter of Example 24 may optionally include the first predefined audio communication connection event being a radio transmission of audio data to the second communication device and the second predefined audio communication connection being a start of processing of audio data to be transmitted to the second communication device.

In Example 26, the subject matter of any one of Examples 22-25 may optionally include the first predefined audio communication connection event being a radio reception of audio data from the second communication device and the second predefined audio communication connection being a start of processing of audio data received from the second communication device.

In Example 27, the subject matter of any one of Examples 22-26 may optionally include the audio processing being an audio processing of audio data to be transmitted to the second communication device and comprising at least one of encoding of audio data from an audio source and forming packets of encoded audio data.

In Example 28, the subject matter of any one of Examples 22-27 may optionally include the audio processing being an audio processing of audio data received from the second communication device and comprising at least one of extracting encoded audio data from packets of encoded audio data and decoding encoded audio data.

In Example 29, the subject matter of any one of Examples 22-28 may optionally include setting the at least one second audio processor wakeup schedule being similar to the first audio processor wakeup schedule comprising setting wakeups according to the at least one second audio processor wakeup schedule to be within a predetermined tolerance of the first audio processor wakeup schedule.

In Example 30, the subject matter of Example 29 may optionally include the predetermined tolerance being 2%, 5%, 10% or 15% of the time between adjacent wakeups according to the first audio processor wakeup schedule.

In Example 31, the subject matter of any one of Examples 22-30 may optionally include the audio processing being processing of voice call data.

In Example 32, the subject matter of any one of Examples 22-31 may optionally include the audio communication connection being a Voice over IP audio communication connection.

In Example 33, the subject matter of any one of Examples 22-32 may optionally include the audio communication connection being a Voice over LTE audio communication connection.

In Example 34, the subject matter of any one of Examples 22-33 may optionally include setting the at least one second audio processor wakeup schedule being similar to the first audio processor wakeup schedule including shifting the at least one second audio processor wakeup schedule from a position according to which the audio processor was waked up previously during the audio communication connection to a position being similar to the first audio processor wakeup schedule.

In Example 35, the subject matter of Example 34 may optionally include searching for a silence period during the audio communication connection and performing the shift during a silence period found.

In Example 36, the subject matter of any one of Examples 34-35 may optionally include performing the shift by scaling or discarding audio data.

In Example 37, the subject matter of any one of Examples 22-36 may optionally include determining a difference between the wakeup timings of the at least one second audio processor wakeup schedule and the wakeup timings of the first audio processor wakeup schedule and setting the at least one second audio processor wakeup schedule being similar to the first audio processor wakeup schedule including shifting the at least one second audio processor wakeup schedule to reduce the difference between the wakeup timings of the at least one second audio processor wakeup schedule and the wakeup timings of the first audio processor wakeup schedule.

In Example 38, the subject matter of Example 37 may optionally include determining the difference during the audio communication connection.

In Example 39, the subject matter of any one of Examples 37-38 may optionally include detecting whether the difference is above a predetermined threshold and shifting the at least one second audio processor wakeup schedule to reduce the difference between the wakeup timings of the at least one second audio processor wakeup schedule and the wakeup timings of the first audio processor wakeup schedule if the difference is above the predetermined threshold.

In Example 40, the subject matter of Example 39 may optionally include the predetermined threshold being 2%, 5%, 10% or 15% of the time between adjacent wakeups according to the first audio processor wakeup schedule.

In Example 41, the subject matter of any one of Examples 22-40 may optionally include the audio processor being implemented by an application processor of the first communication device or a modem of the first communication device.

In Example 42, the subject matter of any one of Examples 22-41 may optionally include the first communication device being a mobile communication device.

Example 43 is a method to trade-off application processor power consumption and application processor processing latencies, modem power consumption and modem processing latencies in a mobile communication device, so that globally, at the platform level, an optimal and adaptive scheduling of audio application processor uplink and downlink activities versus radio modem transmission and reception activities can be used to optimize performances in terms of power consumption and latency as per policies which are predefined, configurable or both, without creating audio artifacts during the scheduling changes.

In Example 44, the subject matter of Examples 43 may optionally include aligning uplink and downlink activities for reducing power consumption.

Example 45 is a computer readable medium having recorded instructions thereon which, when executed by a processor, make the processor perform a method for processing audio data according to any one of Examples 22 to 44.

Example 46 is a device comprising an audio processing means for performing audio processing during an audio communication connection between a first communication device and a second communication device; a memory for storing at least a first audio processing means wakeup schedule based on a first predefined audio communication connection event; a controlling means for setting at least one second audio processing means wakeup schedule in accordance with a second predefined audio communication connection event being similar to the first audio processing means wakeup schedule, and for sending a wake up signal to the audio processing means for waking up the audio processing means based on at least one of the first audio processing means wakeup schedule or the second audio processing means wakeup schedule in response to at least one of the first or second predefined audio communication connection events; wherein the audio processing means further being for entering into a sleep mode after the audio processing is complete and for entering into a processing mode from the sleep mode in response to the wake up signal received.

In Example 47, the subject matter of Examples 46 may optionally include the first predefined audio communication connection event being a start of processing of audio data to be transmitted to the second communication device and the second predefined audio communication connection being a start of processing of audio data received from the second communication device.

In Example 48, the subject matter of Examples 47 may optionally include the audio processing means being for performing the processing of the audio data received from the second communication device in a shorter time than the processing of the audio data to be transmitted to the second communication device and setting the at least one second audio processing means wakeup schedule being similar to the first audio processing means wakeup schedule comprising scheduling the processing of the audio data received from the second communication device to be carried out by the application processor during the processing of the audio data to be transmitted to the second communication device.

In Example 49, the subject matter of any one of Examples 46-48 may optionally include the first predefined audio communication connection event being a radio transmission of audio data to the second communication device and the second predefined audio communication connection being a start of processing of audio data to be transmitted to the second communication device.

In Example 50, the subject matter of any one of Examples 46-49 may optionally include the first predefined audio communication connection event being a radio reception of audio data from the second communication device and the second predefined audio communication connection being a start of processing of audio data received from the second communication device.

In Example 51, the subject matter of any one of Examples 46-50 may optionally include the audio processing being an audio processing of audio data to be transmitted to the second communication device and comprising at least one of encoding of audio data from an audio source and forming packets of encoded audio data.

In Example 52, the subject matter of any one of Examples 46-51 may optionally include the audio processing being an audio processing of audio data received from the second communication device and comprising at least one of extracting encoded audio data from packets of encoded audio data and decoding encoded audio data.

In Example 53, the subject matter of any one of Examples 46-52 may optionally include setting the at least one second audio processing means wakeup schedule being similar to the first audio processing means wakeup schedule comprising setting wakeups according to the at least one second audio processing means wakeup schedule to be within a predetermined tolerance of the first audio processing means wakeup schedule.

In Example 54, the subject matter of Example 53 may optionally include the predetermined tolerance being 2%, 5%, 10% or 15% of the time between adjacent wakeups according to the first audio processing means wakeup schedule.

In Example 55, the subject matter of any one of Examples 46-54 may optionally include the audio processing being processing of voice call data.

In Example 56, the subject matter of any one of Examples 46-55 may optionally include the audio communication connection being a Voice over IP audio communication connection.

In Example 57, the subject matter of any one of Examples 46-56 may optionally include the audio communication connection being a Voice over LTE audio communication connection.

In Example 58, the subject matter of any one of Examples 46-57 may optionally include setting the at least one second audio processing means wakeup schedule being similar to the first audio processing means wakeup schedule including shifting the at least one second audio processing means wakeup schedule from a position according to which the audio processing means was waked up previously during the audio communication connection to a position being similar to the first audio processing means wakeup schedule.

In Example 59, the subject matter of Example 58 may optionally include the controlling means being for searching for a silence period during the audio communication connection and performing the shift during a silence period found.

In Example 60, the subject matter of any one of Examples 58-59 may optionally include the controlling means being for performing the shift by scaling or discarding audio data.

In Example 61, the subject matter of any one of Examples 46-60 may optionally include the controlling means being for determining a difference between the wakeup timings of the at least one second audio processing means wakeup schedule and the wakeup timings of the first audio processing means wakeup schedule and setting the at least one second audio processing means wakeup schedule being similar to the first audio processing means wakeup schedule including shifting the at least one second audio processing means wakeup schedule to reduce the difference between the wakeup timings of the at least one second audio processing means wakeup schedule and the wakeup timings of the first audio processing means wakeup schedule.

In Example 62, the subject matter of Example 61 may optionally include the controlling means being for determining the difference during the audio communication connection.

In Example 63, the subject matter of any one of Examples 61-62 may optionally include the controlling means being for detecting whether the difference is above a predetermined threshold and for shifting the at least one second audio processing means wakeup schedule to reduce the difference between the wakeup timings of the at least one second audio processing means wakeup schedule and the wakeup timings of the first audio processing means wakeup schedule if the difference is above the predetermined threshold.

In Example 64, the subject matter of Examples 63 may optionally include the predetermined threshold being 2%, 5%, 10% or 15% of the time between adjacent wakeups according to the first audio processing means wakeup schedule.

In Example 65, the subject matter of any one of Examples 46-64 may optionally include the audio processing means being implemented by an application processor of the first communication device or a modem of the first communication device.

In Example 66, the subject matter of any one of Examples 46-65 may optionally include the first communication device being a mobile communication device.

It should be noted that one or more of the features of any of the examples above may be combined with any one of the other examples.

In the following, embodiments are described in more detail with reference to the architecture described above with reference to FIG. 3.

It should be noted that the VoIP engine 303 may for example be implemented by means of the application processor 111 of the mobile terminal 300 as well as by means of the modem 112 of the mobile terminal 300 which for example also implements (at least in part) the transceiver 306.

It can be expected that the biggest improvement in terms of power consumption by means of alignment of audio communication activities as described with reference to FIG. 4 can be achieved with an architectures where the VoIP engine is located on (i.e. is implemented by) the application processor 111.

The reason for this is that with an architecture with VoIP 303 engine on the modem 112, even if the number of wake ups related to audio VoLTE processing activities are reduced, the modem 112 may still be frequently activated because of it performing other recurrent activities in parallel (like neighbor cells monitoring, paging request monitoring etc.). In particular, for example, the MAC layer of the modem 112 has to perform LTE processing every 1 ms. To address this issue, audio (uplink/downlink) processing activities may be aligned with radio transmission and radio reception activities. Thus, it may be achieved that the number of modem wakeups are reduced. This is explained in more detail further below.

In the example described in the following, it is assumed that the VoIP engine 303 is implemented by an application processor 111 of the mobile terminal, e.g. in the form of an application executed by the application processor 111, and audio uplink processing and audio downlink processing are aligned.

With the VoIP engine 303 on the application processor side and the alignment of audio uplink and downlink processing, once it has performed VoIP audio processing activities for a speech frame in a typical VoIP use case (excluding concurrency scenarios with e.g. video in parallel), the application processor 111 (and for example the mobile terminal's 300 SoC (System on Chip)) can then enter a low power mode waiting for the next speech frame to be processed. So, one wake up on the application processor side would happen typically every 20 ms or 40 ms during a VoLTE call with the alignment of audio uplink processing and audio downlink processing, whereas, without this approach, two wake ups every 20 ms or 40 ms would be necessary (e.g. depending on the network DRX(discontinuous reception)/SPS(semi persistent scheduling)/ptime configuration).

Rather than using a random point of time for UL/TX audio and DL/RX audio activity alignment, in one example such as the one as follows, the alignment is performed to enable lower power but with low impact (and potentially no impact at all) on end to end latency. Actually, for example, two things which are typically in opposition, namely power consumption and latency are optimized.

At first, the controller 403 measures the misalignment between UL/TX audio activities and DL/RX audio activities. It may for example collect statistical data to determine whether the misalignment is stable or moving: in VoIP scenarios, with network jitter and sample based jitter buffer management being used on the reception side, the time instant for DL/RX audio activities may be moving. The controller 403 for example avoids interfering with this as the JBM (jitter buffer management) is working to minimize DL latency while enabling at the same time protection against network jitter. So, the controller 403 does for example not shift DL/RX activities but aligns UL audio activities to DL audio activities.

On a VoLTE system, for a VoLTE call, two types of scheduling may be used:

1) Dynamic scheduling: when the mobile terminal (i.e. UE in the case of LTE) has data to transmit, the UE sends a Scheduling Request to the network (e.g. to E-UTRAN 101) to get resources granted for UL radio transmission. So, with dynamic scheduling, the time instant for UL radio transmission may be changed via this mechanism.

2) Semi Persistent Scheduling (SPS): in this case, predefined time instants are allocated by the network (e.g. E-UTRAN 101) for UL transmission. This allows avoiding using the negotiation mechanism at every speech frame for the UE being granted resources for radio transmission. In this case the UE cannot change the radio UL time instant for UL radio transmission.

For dynamic scheduling, a shift of UL audio TX processing activities has limited impact (and most of the time even no impact) on end to end latency whereas in case of SPS end to end latency will typically be changed.

Concerning SPS, two cases arise:

Either a shift of UL audio processing activities diminishes overall end to end latency or A shift of UL audio processing activities increases overall end to end latency.

By measuring the time elapsed between completion of UL/TX audio processing activities and the start of radio UL transmission, the controller 403 can deduce whether an UL/TX audio processing activities shift will increase or decrease the overall end to end latency.

So, based on this information, the controller 403 can take an educated decision that may result in:

1. Reducing power consumption and reducing end to end latency,
2. Reducing power consumption with limited or no impact on end to end latency,
3. Reducing power consumption and increasing end to end latency, wherein the power reduction is achieved by shifting UL/TX audio processing activities to align them with DL/RX audio processing activities such that there is a single wake up source or, in other words, a common wake up schedule for UL/TX audio processing and DL/RX audio processing. This may allow significantly reducing power consumption with a VoIP engine located on an application processor, i.e. decorrelated from modem activities.

In cases 1 and 2, the controller 403 may for example always enforce the shift/alignment. In case 3, the controller 403 may decide whether to perform the shift/alignment based on a device policy.

The controller 403 may dynamically align UL/TX audio processing activities during a VoIP call adaptively during the whole call duration wherein it performs the shift of audio processing activities in a smooth way (without creating audible distortions) and wherein it takes into account the two audio KPIs (Key Performance Indicators) power consumption and end to end latency that are typically in opposition.

Thus, the whole audio system implemented by, in this example, the application processor 111, is dynamically adapted in terms of wakeups for lower power consumption and lower latency.

For example, a mobile terminal based on an IMS (Internet Protocol Multimedia Subsystem) APE (application processor) centric architecture may be optimized with regard to power consumption.

IMS APE centric architectures are typically very attractive as they can easily support IMS features (IR.94, IMS over WiFi, RCSe etc. . . . ), can be easily upgraded and are easier to support in a cost effective way in contrast to a modem centric architecture with VoIP engine located on the modem. Modem centric architectures are typically optimized for one use case (namely a low power VoLTE call in case of LTE) but typically make the support of other IMS use cases and features much more complicated compared to an IMS APE centric architecture.

Still, some mobile phone manufacturers are recommending modem centric architectures whereas others are supporting (and working internally) on APE centric architectures. So, it may be desirable to have an approach for both architectures.

It should be noted that the examples described in context of VoLTE may adapted to other VoIP applications. Today, the biggest pressure in terms of VoIP power consumption is in context of VoLTE calls.

Figure 6:
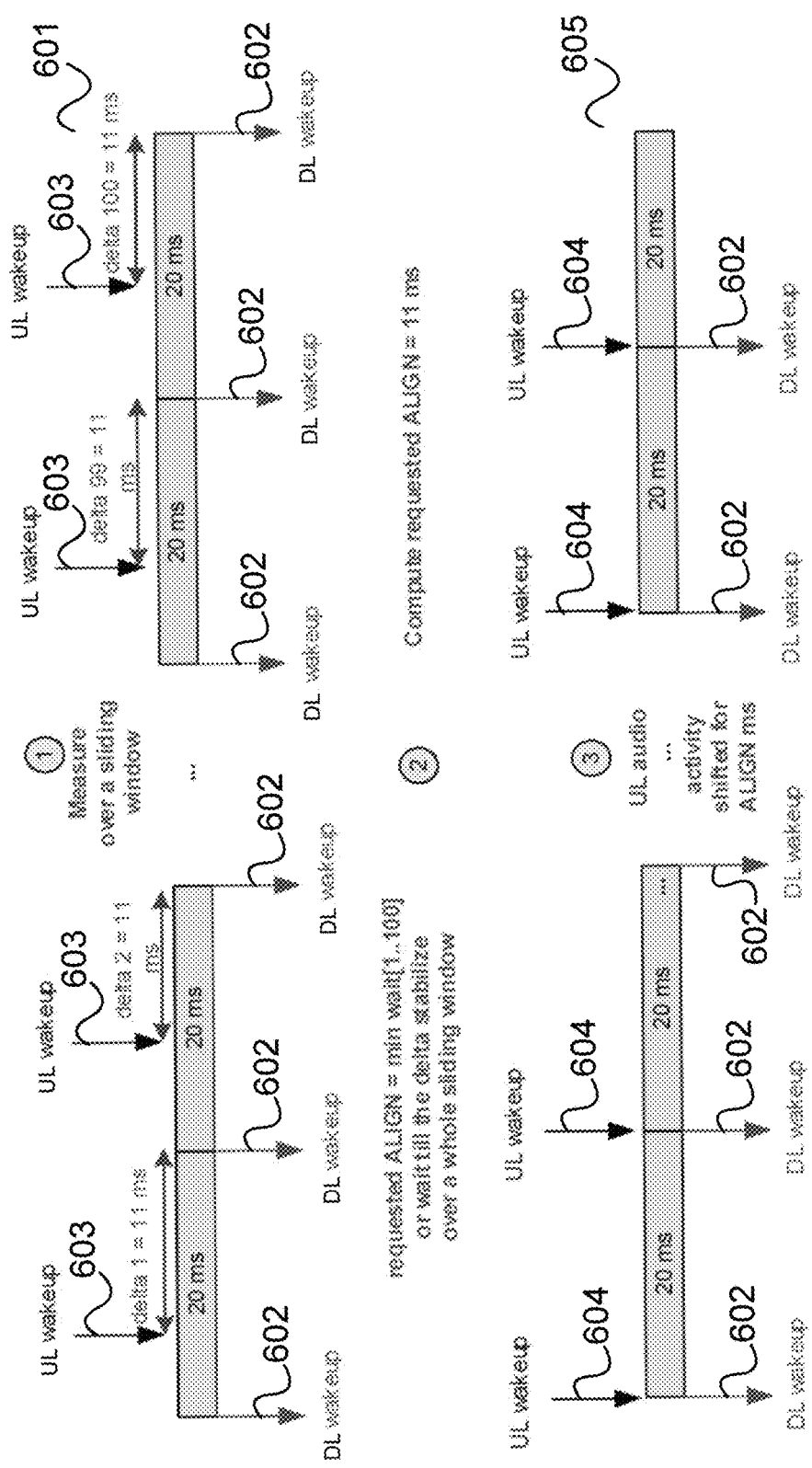
FIG. 6 illustrates a process of alignment of UL/TX audio processing activities with DL/RX audio processing activities.

FIG. 6 illustrates a process of alignment of UL/TX audio processing activities with DL/RX audio processing activities.

The process is for example performed by controller 403 of communication device 400, which for example corresponds to mobile terminal 105 and mobile terminal 300.

A first diagram 601 shows the downlink wakeup schedule of downlink wakeups which are evenly spaced at time intervals of 20 ms. Further, an uplink wakeup schedule of uplink wakeups includes uplink wakeups 603 which are also evenly spaced at time intervals of 20 ms. However, the uplink wakeup schedule can be seen to be shifted 11 ms to the left, i.e. each uplink wakeup 603 precedes a downlink wakeup 602 by 11 ms.

The controller 403 measures this misalignment, i.e. the shift of the uplink wakeup schedule with respect to the downlink wakeup schedule, e.g. over a sliding window. For example, the controller 403 may measure for a predetermined time or waits until the shift stabilizes over the whole sliding window.

In other words, the controller 403 collects measurements about audio UL and DL wakeups misalignments. DL wakeups may be moving as a consequence of DL SJBM (Sample Based Jitter Buffer Management) activities, such that, in case of an alignment, the UL wakeups can be seen to track the DL wakeups.

So the controller 403 may wait for some time until DL wakeups are stabilized before considering aligning UL audio processing activities with DL audio processing activities. Once the DL wakeup schedule is stable, e.g. a stability criterion is fulfilled, the controller 403 determines a value for the alignment based on the measurement results (and e.g. DL wakeup statistics). In this example, the controller 403 determines an alignment value ALIGN=11 ms.

The controller 403 may evaluate the impact on end to end latency:

In case of VoLTE dynamic scheduling the controller 403 may be configured to enforce the shift of the UL wakeup schedule by the determined value.

In case of VoLTE Semi Persistent Scheduling the controller 403 may be configured to evaluate the impact on the latency of the VoLTE connection, i.e. determine whether the latency of the connection increases, decreases or stays unchanged when the UL wakeup schedule is shifted by the determined value. Based on a for example configurable policy, the controller 403 then takes the decision whether to perform the shift of the UL audio processing activities.

It should be noted that perfect alignment may not be required: it is typically sufficient that the DL processing activities fit within the UL processing activities so that they can be executed in parallel on different cores (physical or hyper threading) since a multi-core architecture is now a typical feature of mobile phone application processors. Also, the UL processing activities of VoLTE take much more time than the DL processing activities: this is the consequence of the use of codecs like AMR (adaptive multi-rate) or EVS (Enhanced Voice Service), Opus etc. where encoding is much more time consuming than decoding. In fact, AMR encoding typically takes around four times longer than AMR decoding.

Assuming the controller 403 decides to enforce the alignment, it shifts the UL wakeup schedule resulting in the UL wakeup schedule including shifted UL wakeups 604 to be aligned with the DL wakeups 602 of the DL wakeup schedule as illustrated in a second diagram 605. Thus, the UL processing activities are aligned or overlapping with the DL processing activities.

The controller 403 may perform such an alignment multiple times during a VoLTE (or generally VoIP) call. This may be achieved without audio artifacts so that the UL processing activities can smoothly catch up with the evolution of DL processing activities and the whole audio system is dynamic.

FIG. 7 illustrates how the controller 403 may enforce, i.e. achieve, the alignment of the UL wakeup schedule with the DL wakeup schedule.

Before the alignment, as illustrated by a first diagram 701, it is assumed that the audio input buffer 702 of the mobile terminal (e.g. corresponding to audio input buffer 302) is filled by audio samples corresponding to 22 ms, as indicated by a section 703 of the audio input buffer 702 delimited to the left (assuming that the buffer 702 is filled from right to left) by a pointer cp_ptr where new samples are read from the buffer 702 and to the right by a pointer dsp_ptr indicating where a component of the VoIP engine 303, e.g. a DSP (digital signal processor) 704 writes samples to the buffer 702 to be (e.g. before some processing by the DSP 704) coded by a codec 705 (after reading the samples). The DSP 704 and the codec 705 may for example implement at least in part the VoIP engine 303. It should be noted that in uplink, the DSP 704 writes to the buffer 702 and the application processor reads from the buffer 702 while in downlink, the application processor writes to the buffer and the DSP 704 reads from the buffer 702.

By default, wakeups for audio UL processing activities during a VoLTE call happen typically every 20 ms (or 40 ms). Theoretically it is possible that the network configures the use of higher values (a multiple of 20 ms) but 20 ms and 40 ms are the typical values for VoLTE calls. With other codecs like opus, ilbc or isac, different values could be used: 5 ms, 10 ms, 30 ms . . . .

When performing the shift of audio UL processing activities, the controller 403 may use one of the following two approaches:

Discarding audio (e.g. pcm (pulse code modulation)) samples. The controller 403 may for example trigger this during silence periods.

Time scaling the audio, i.e. compression or expansion of the audio signal (e.g. one or more speech frames).

The controller 403 may also use a combination of these two approaches. For example, it may wait for a silence period and in case no silence period occurs, e.g. after a certain time out, it can trigger speech frame time scaling. However, during a speech call, there are statistically close to 50% of silence periods and even when the users are speaking continuously, there are regular small silence periods.

For the alignment, in the present example, a silence period of less than 20 ms is required, so discarding audio samples during silence periods can be expected to be appropriate allow covering most if not all of the cases. In extreme cases, to allow handling of all scenarios, the controller may consider speech frame time scaling as an additional refinement.

In the example of FIG. 7, once the controller 403 has decided to shift the audio UL processing activities and once it has determined the alignment value (ALIGN=11 ms) specifying how many ms the UL audio processing activities should be shifted, the controller 403 performs every 20 ms (or every 40 ms) an (e.g. pcm) analysis on the captured samples to detect a frame suitable for sample discarding without hearable audio artifacts.

When the controller 403 has detected such a frame, the controller 403 discards audio samples of as many ms as given by the alignment value (i.e. 11 ms worth of samples in this example), e.g. by reading and dropping some audio samples or, as illustrated in FIG. 7, by rewinding a counter or pointer so that the audio samples to be discarded are ignored and will later on be overwritten.

Specifically, in the example of FIG. 7, the pointer cp_ptr is rewinded (shifted to the right) by 11 ms as illustrated by a second diagram 706 such that 11 ms of audio samples are effectively discarded and 11 ms of audio samples have to be input into the buffer in addition until a wakeup is triggered. For example, if a wakeup is triggered at a buffer level of 22 ms, 11 ms are still missing after rewinding the counter cp_ptr and only after another 11 ms, the missing samples for UL encoding of a full speech frame are available and a UL wakeup is triggered such that the audio UL processing activities and the associated UL wakeup are delayed by 11 ms.

After the shift, the UL wakeup schedule again continues with periodic wakeups, every 20 ms (or 40 ms) such that the alignment of audio UL processing activities to audio DL processing activities has been performed.

The controller 403 may repeat this process over and over during the whole call. Thus, the audio system is dynamic during the VoLTE/VoIP call with DL (playback) acting as a master and UL performing regular alignments to the DL in an adaptive and smooth way. It is optimized for lower power and able to cope with a system working to reach minimal downlink latency and maximum network jitter protection with no impact on a lot of cases on UL latency and some tradeoffs decisions (power vs. UL latency) that can be taken on the remaining cases.

The example described above with reference to FIGS. 6 and 7 was based on an architecture where the VoIP engine 303 is implemented on the application processor 111. However, a similar approach may also be used in an architecture where the VoIP engine 303 is implemented on the modem, e.g. on LTE modem 112.

In the following, an example is described which is based on a modem centric architecture, i.e. with the VoIP engine 303 being implemented on the modem 112, wherein the cases of both optimized and non-optimized network settings in terms of uplink radio transmission and downlink radio transmission are considered.

In the following example, in order to reduce the overall power consumption of a VoLTE platform, e.g. the mobile terminal 300, during a call (e.g. an IMS or IR92 call), the number of core wake ups, in this example modem wake-ups is reduced. For this purpose activities required during the call are synchronized and scheduled to enhance the core sleep opportunity.

Figure 8B:
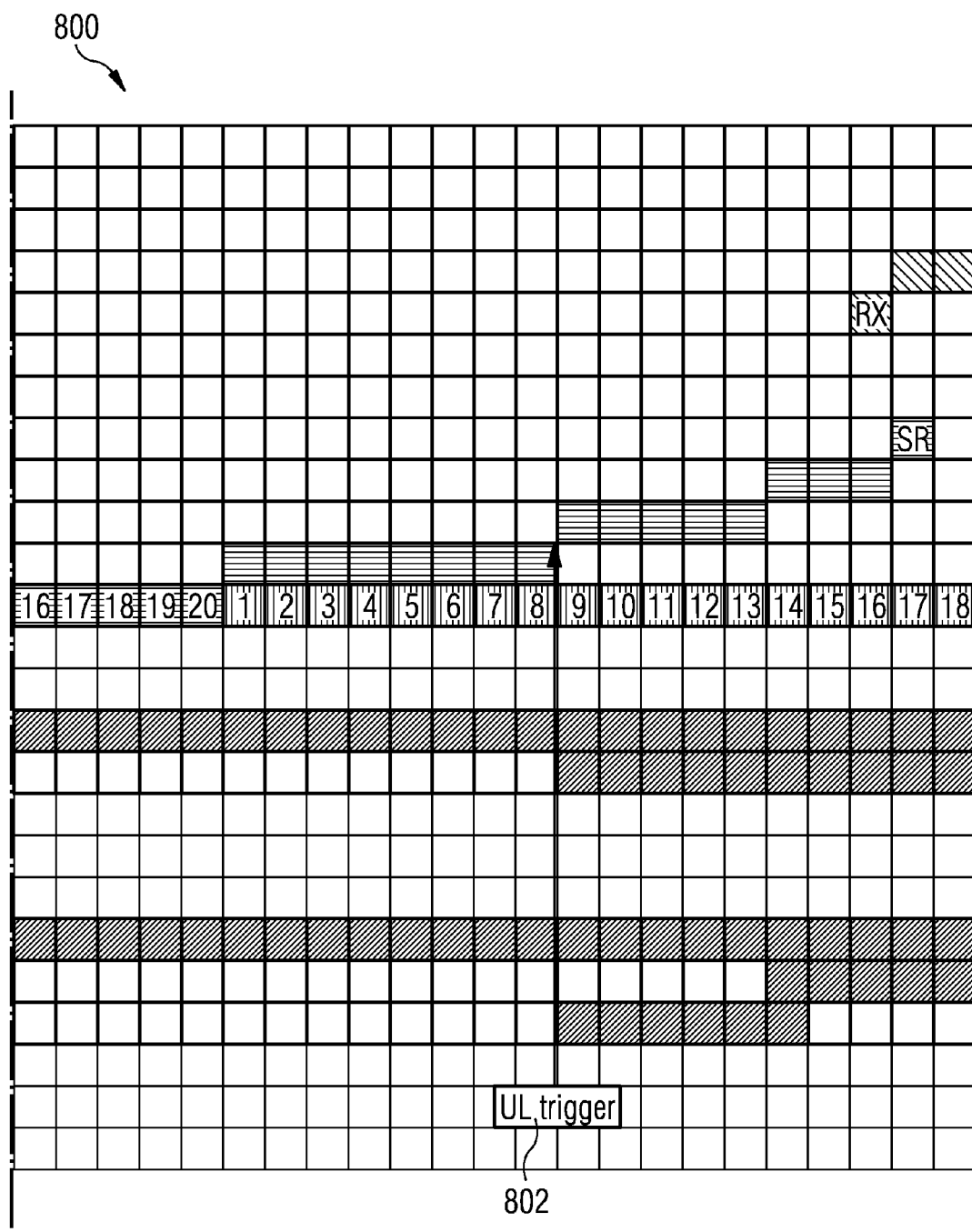
Figure 8C:
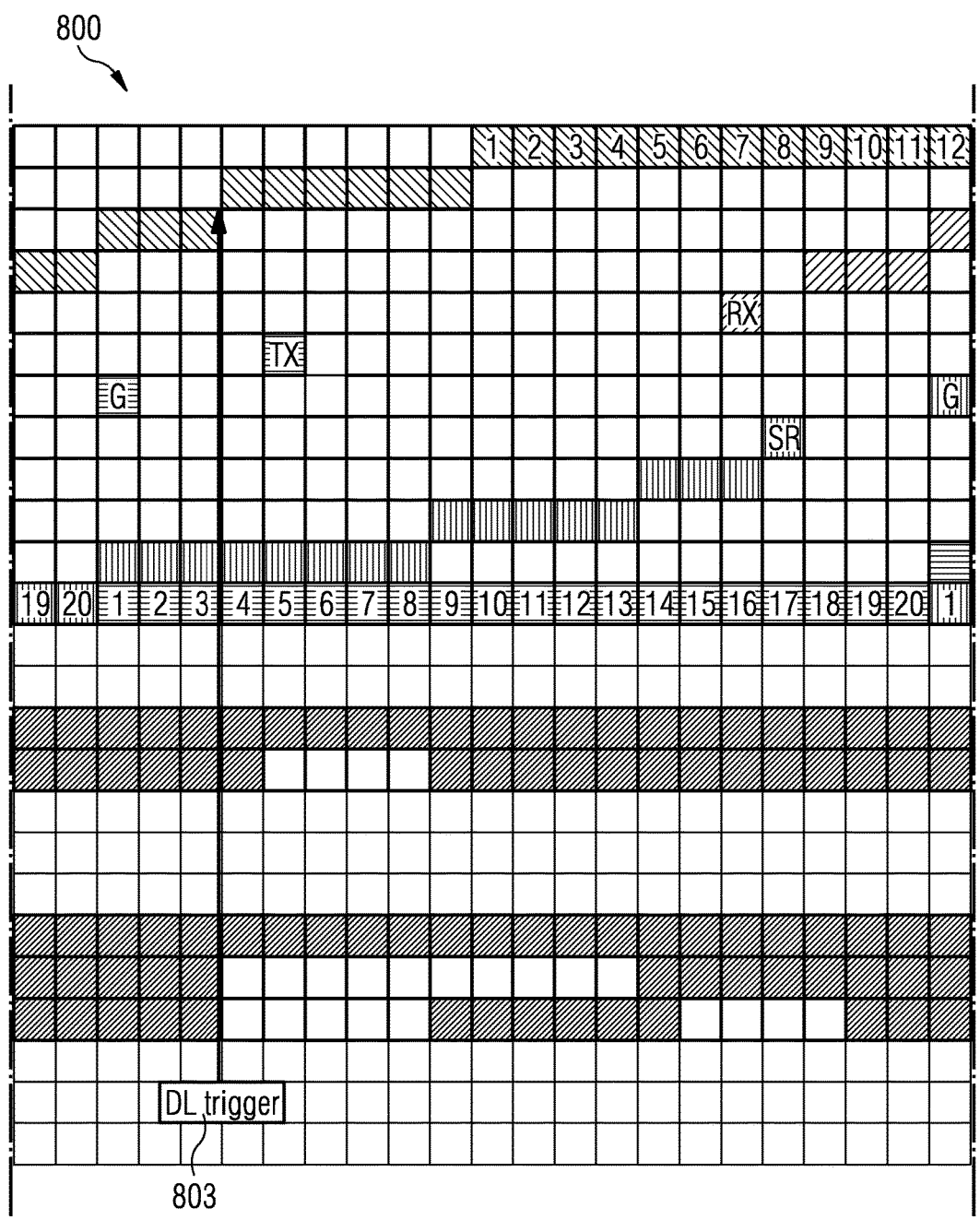
Figure 8D:
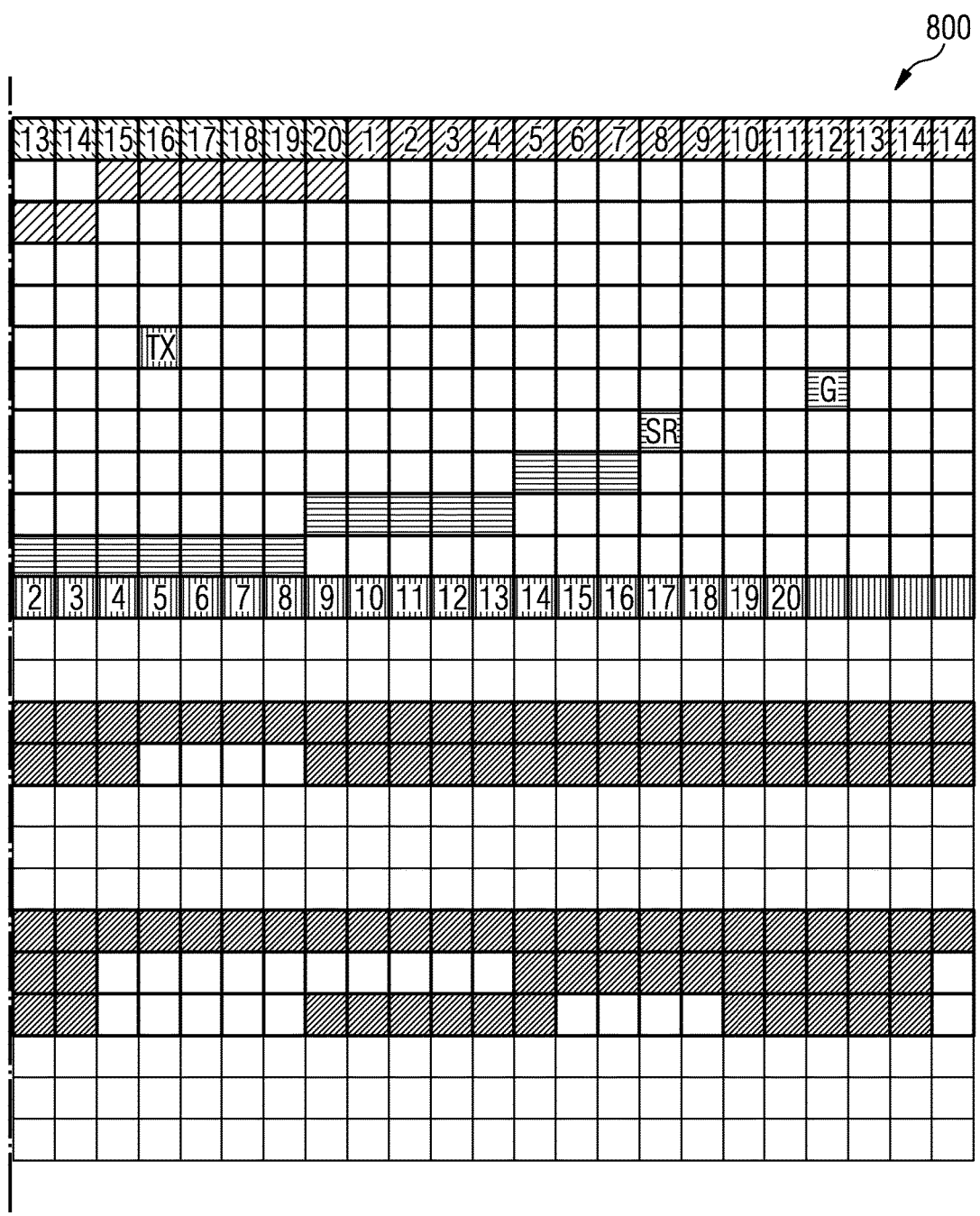
Figure 9B:
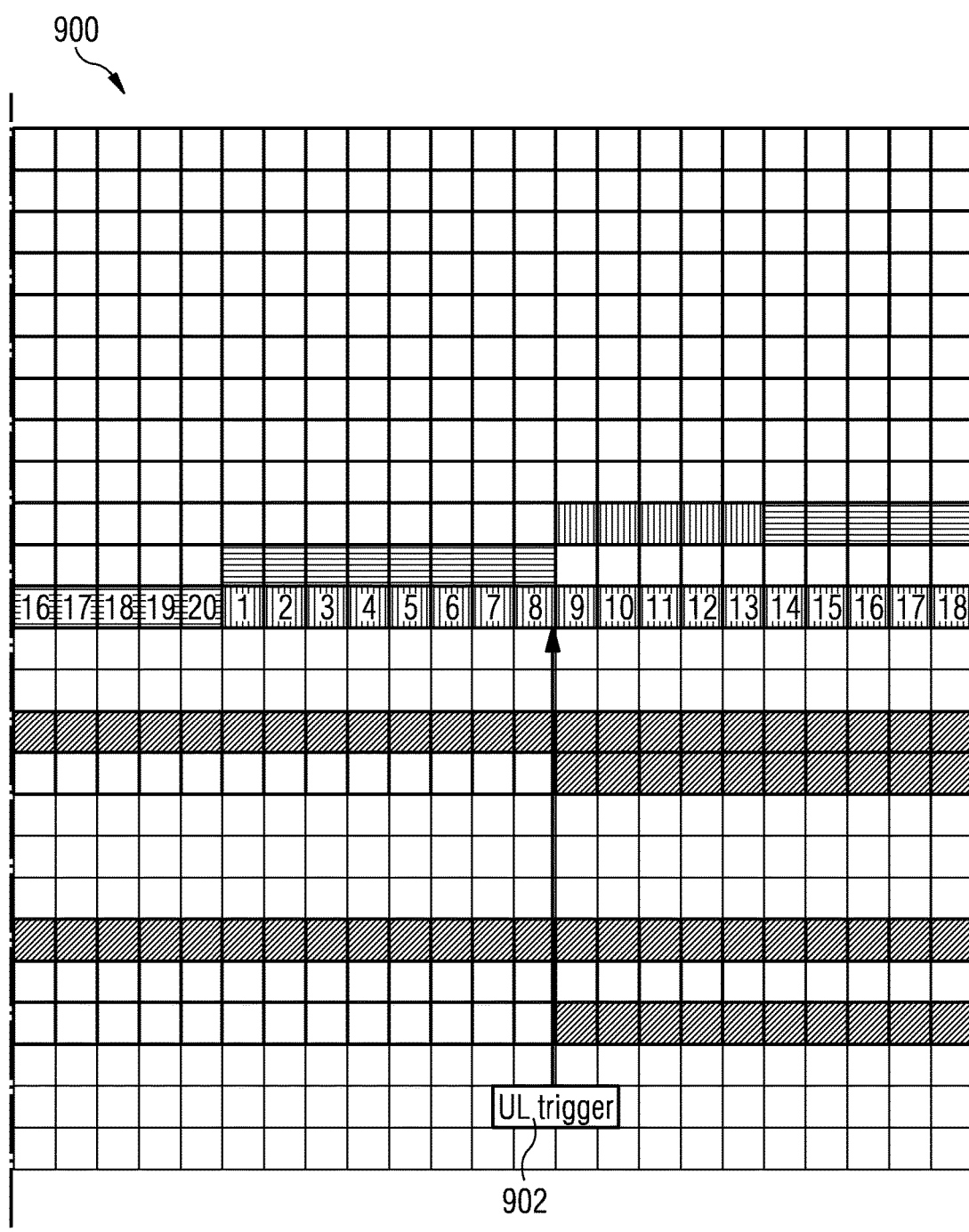
Figure 9C:
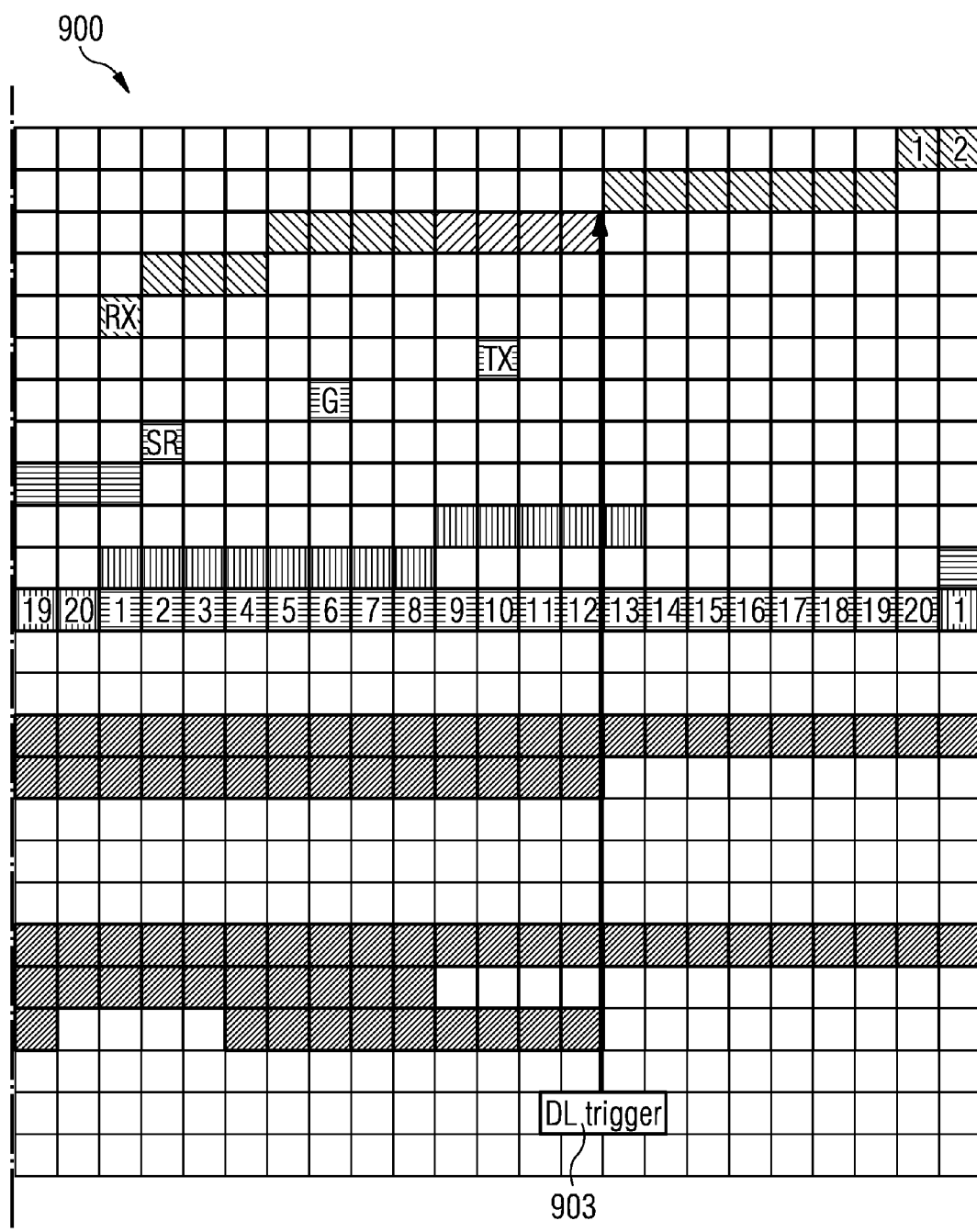
Figure 9D:
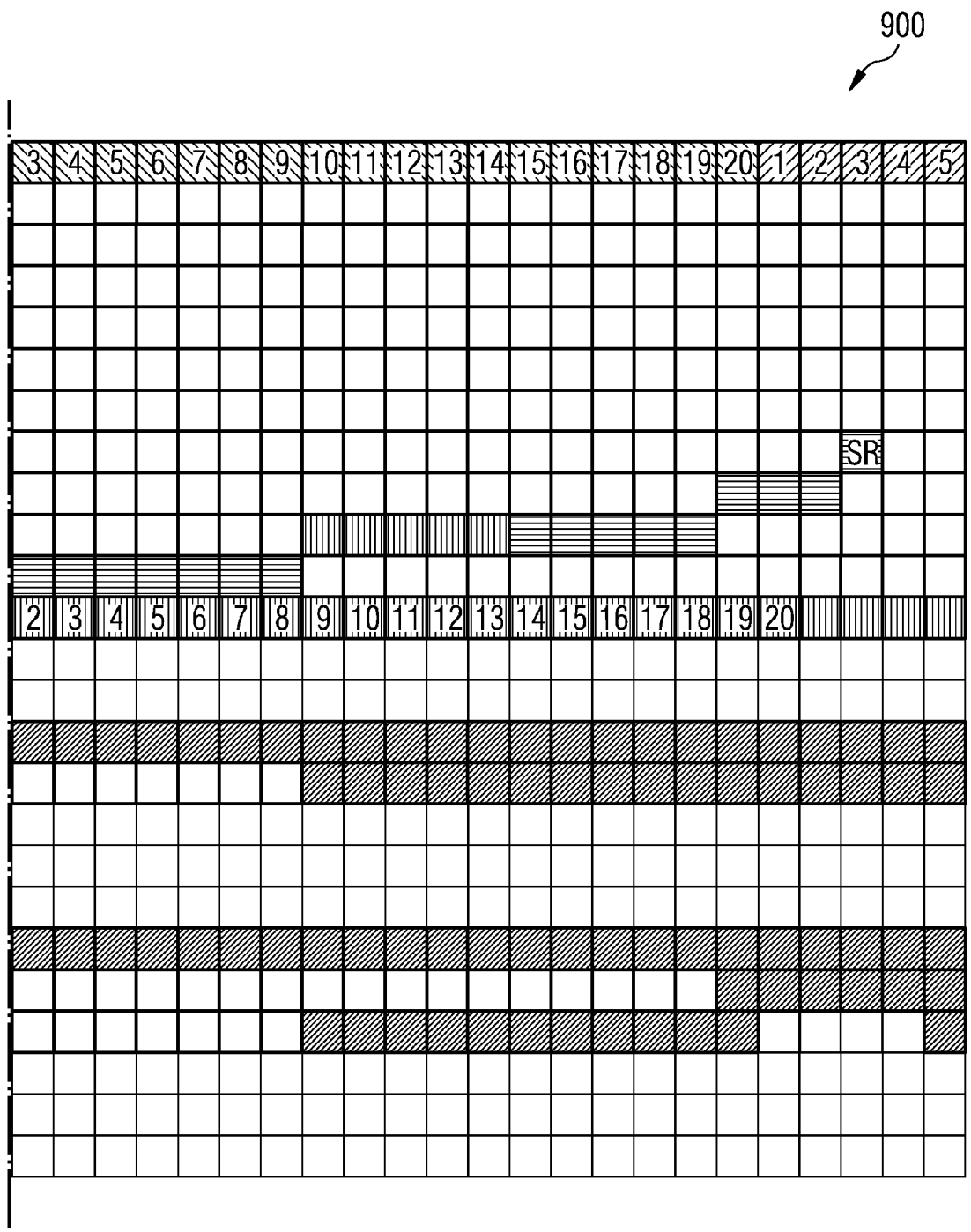

Specifically, in this example, the uplink audio processing and the audio downlink processing are aligned to the uplink radio (e.g. LTE) transmission and the downlink radio (e.g. LTE) transmission schedule as illustrated in FIGS. 8 and 9.

FIGS. 8 and 9 show time diagrams 800, 900 illustrating the time of uplink activities and downlink activities.

An active state of an respective component/functionality is indicated by a shaded box while an inactive state of the component/functionality is indicated by a white box in the diagrams 800, 900.

In the examples illustrated in FIGS. 8 and 9, UL and DL audio processing is aligned to the UL and DL radio transmission.

In a network configuration optimized for a VoLTE call, the UL TX and DL RX LTE slot are close to each other (ideally within four TTIs (time transmission intervals) in order to send the RX ACK (acknowledgement) in the same slot as the TX or vice versa. The position of the SR (Scheduling Request) 801, 901 is close to the onDuration-Start. In case of an SR periodicity of less than a DRX cycle the mobile terminal 300 selects the SR closest to the onDurationStart.

The UL interrupt 802, 902 and the DL interrupt 803, 903 from the audio subsystem to trigger sending of audio data or playout of received data are scheduled relative to the TX transmission 804, 904 and the RX transmission 805, 905 with some offset related to the audio processing (audio encoding/decoding if applicable, RTP framing, IP framing . . . ) and propagation time. This allows a configuration with low latency and power consumption from a modem centric and also from an AP centric perspective. Indeed, the application processor and the modem have already been waked up when the interrupt for audio playout is raised due to the reception of audio data as shown by the modem state 806, 906 and the application processor state 807, 907.

In case of non-optimized network configuration where LTE radio reception and radio transmission are not close to each other the controller 403 can determine whether either the power consumption or the latency is to be reduced. To reduce the power consumption on an AP centric solution, the UL processing interrupt and the DL processing interrupt can be positioned to be in the same wake up cycle. In case of bad radio conditions, the actual successful RX slot can be shifted (i.e. the actual RX will be later due to the network). The controller 403 can use this information to position the UL processing interrupt and the DL audio processing interrupt to reduce both power consumption and delay.

In case of an architecture the VoIP engine 303 being implemented on the application processor 111 on top of an LTE modem 112, there is potentially a tradeoff between reducing power consumption on the application processor and reducing power consumption on the modem.

Since codec encoding (e.g. AMR encoding) is usually much longer than decoding there is some flexibility to schedule the DL decoding on the application processor in parallel to the uplink encoding on the application processor without requiring two wakeups of the application processor.

For example, the modem 112 reports to the application processor based on its knowledge of the TX/RX radio transmission slot scheduling or constraints the optimal shift of UL/DL activities from a modem perspective to optimize modem power consumption. If this shift still enables the DL processing on the application processor 111 to occur before the end of UL processing then the controller enforces this configuration and may thus achieve a single wake up of both application processor and modem.

Otherwise, the controller 403 may take a decision to have either:
  two wake ups of the application processor and one wake up of the modem or
  one wake up of the application processor and two wake ups of the modem.

In case of two wake ups, depending on the time interval between the two activities (enabling more or less sleep time), the modem and the application processor may provide a power impact evaluation that enables the controller to take an educated decision.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A device, comprising:
an audio processor configured to perform audio processing during an audio communication connection between a first communication device and a second communication device;
a memory configured to store at least a first audio processor wakeup schedule in accordance with a first predefined audio communication connection event;
a controller configured to
set at least one second audio processor wakeup schedule based on a second predefined audio communication connection event being similar to the first audio processor wakeup schedule, and
send a wake up signal to the audio processor to wake up the audio processor based on at least one of the first audio processor wakeup schedule or the second audio processor wakeup schedule in response to at least one of the first or second predefined audio communication connection events;
determine a difference between the wakeup timings of the at least one second audio processor wakeup schedule and the wakeup timings of the first audio processor wakeup schedule and wherein setting the at least one second audio processor wakeup schedule to be similar to the first audio processor wakeup schedule includes shifting the at least one second audio processor wakeup schedule to reduce the difference between the wakeup timings of the at least one second audio processor wakeup schedule and the wakeup timings of the first audio processor wakeup schedule; and
wherein the audio processor is further configured to enter a sleep mode after the audio processing is complete and to enter into a processing mode from the sleep mode in response to a wake up signal.

2. The device of claim 1, wherein the first predefined audio communication connection event is a start of processing of audio data to be transmitted to the second communication device and the second predefined audio communication connection is a start of processing of audio data received from the second communication device.

3. The device of claim 2, wherein the audio processor is configured to carry out the processing of the audio data received from the second communication device in a shorter time than the processing of the audio data to be transmitted to the second communication device and wherein setting the at least one second audio processor wakeup schedule to be similar to the first audio processor wakeup schedule comprises scheduling the processing of the audio data received from the second communication device to be carried out by the application processor during the processing of the audio data to be transmitted to the second communication device.

4. The device of claim 1, wherein the first predefined audio communication connection event is a radio transmission of audio data to the second communication device and the second predefined audio communication connection is a start of processing of audio data to be transmitted to the second communication device.

5. The device of claim 1, wherein the first predefined audio communication connection event is a radio reception of audio data from the second communication device and the second predefined audio communication connection is a start of processing of audio data received from the second communication device.

6. The device of claim 1, wherein the audio processing is an audio processing of audio data to be transmitted to the second communication device and comprises at least one of encoding of audio data from an audio source and forming packets of encoded audio data.

7. The device of claim 1, wherein the audio processing is an audio processing of audio data received from the second communication device and comprises at least one of extracting encoded audio data from packets of encoded audio data and decoding encoded audio data.

8. The device of claim 1, wherein setting the at least one second audio processor wakeup schedule to be similar to the first audio processor wakeup schedule comprises setting wakeups according to the at least one second audio processor wakeup schedule to be within a predetermined tolerance of the first audio processor wakeup schedule.

9. The device of claim 8, wherein the predetermined tolerance is 2%, 5%, 10% or 15% of the time between adjacent wakeups according to the first audio processor wakeup schedule.

10. The device of claim 1, wherein the audio processing is processing of voice call data.

11. The device of claim 1, wherein the audio communication connection is a Voice over IP audio communication connection.

12. The device of claim 1, wherein the audio communication connection is a Voice over LTE audio communication connection.

13. The device of claim 1, wherein setting the at least one second audio processor wakeup schedule to be similar to the first audio processor wakeup schedule includes shifting the at least one second audio processor wakeup schedule from a position according to which the audio processor was waked up previously during the audio communication connection to a position to be similar to the first audio processor wakeup schedule.

14. The device of claim 13, wherein the controller is configured to search for a silence period during the audio communication connection and perform the shift during a silence period found.

15. The device of claim 13, wherein the controller is configured to perform the shift by scaling or discarding audio data.

16. The device of claim 1, wherein the controller is configured to determine the difference during the audio communication connection.

17. A method for processing audio data comprising:

storing at least a first audio processor wakeup schedule in accordance with a first predefined audio communication connection event;

setting at least one second audio processor wakeup schedule in accordance with a second predefined audio communication connection event to be similar to the first audio processor wakeup schedule, waking up an audio processor, configured to carry out audio processing during an audio communication connection between a communication device and a second communication device, in accordance with at least one of the first audio processor wakeup schedule or the second audio processor wakeup schedule in response to the incidence of at least one of the first or second predefined audio communication connection events;

determining a difference between the wakeup timings of the at least one second audio processor wakeup schedule and the wakeup timings of the first audio processor wakeup schedule and wherein setting the at least one second audio processor wakeup schedule to be similar to the first audio processor wakeup schedule includes shifting the at least one second audio processor wakeup schedule to reduce the difference between the wakeup timings of the at least one second audio processor wakeup schedule and the wakeup timings of the first audio processor wakeup schedule; and wherein the audio processor enters a sleep mode after finishing the audio processing and enters a processing mode from the sleep mode in response to a wake up signal received.

18. A non-transitory computer readable medium having recorded instructions thereon which, when executed by a processor, make the processor perform a method for processing audio data according to claim 17.

* * * * *